(12) United States Patent
Dhar et al.

(10) Patent No.: US 9,514,452 B2
(45) Date of Patent: Dec. 6, 2016

(54) SYSTEM AND METHOD FOR SIMPLIFIED CHECKOUT WITH PAYMENT FLOAT

(71) Applicant: eBay Inc., San Jose, CA (US)

(72) Inventors: Shilpa Dhar, San Jose, CA (US); Jeff Harrell, San Jose, CA (US); Cody Evol, San Francisco, CA (US); Cristina Escutia, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/085,755

(22) Filed: Nov. 20, 2013

(65) Prior Publication Data

US 2014/0143136 A1     May 22, 2014

Related U.S. Application Data

(60) Provisional application No. 61/728,710, filed on Nov. 20, 2012.

(51) Int. Cl.
*G06Q 10/10* (2012.01)
*G06Q 20/10* (2012.01)
*G06Q 20/22* (2012.01)
(Continued)

(52) U.S. Cl.
CPC ............ *G06Q 20/227* (2013.01); *G06Q 10/10* (2013.01); *G06Q 20/0453* (2013.01); *G06Q 20/10* (2013.01); *G06Q 20/3224* (2013.01); *G06Q 30/01* (2013.01)

(58) Field of Classification Search
CPC .... G06Q 40/00; G06Q 20/227; G06Q 10/10; G06Q 20/0453; G06Q 20/10; G06Q 20/3224; G06Q 30/01
See application file for complete search history.

(56) References Cited

U.S. PATENT DOCUMENTS 7,346,546 B2 * 3/2008 Anderson .............. G06Q 30/02
                                                        705/26.5
7,353,203 B1 * 4/2008 Kriplani ................. G06Q 20/02
                                                        705/39
(Continued)

FOREIGN PATENT DOCUMENTS

CN           105027152 A     11/2015
WO     WO-2014081891 A1      5/2014

OTHER PUBLICATIONS

Patents; patent application titled "methods for facilitating online transactions involving a plurality of unique currencies" published online. (2013). Computers, Networks & Communications, 1405. Retrieved from http://search.proquest.com/docview/1464750969?accountid=14753.*

(Continued)

*Primary Examiner* — Muriel Tinkler
(74) *Attorney, Agent, or Firm* — Maschoff Brennan

(57) ABSTRACT

In various embodiments, a system and method for providing simplified checkout with payment float are provided. In example embodiments, an identifier that corresponds to a payment account of a user is received at a payment provider system. A determination is made that the identifier corresponds to a payment account of the user at the payment provider system. A determination is made to provide a float option to float payment for the user in a payment transaction involving a merchant system. A user interface providing the float option is presented to the user. If the user selects the float option, payment is floated to the user and the user agrees to pay back the floated payment within a predetermined time period.

20 Claims, 16 Drawing Sheets

(51) Int. Cl.
  *G06Q 30/00* (2012.01)
  *G06Q 20/04* (2012.01)
  *G06Q 20/32* (2012.01)
  *G06Q 40/00* (2012.01)

(56) References Cited

U.S. PATENT DOCUMENTS

| | | | | |
|---|---|---|---|---|
| 7,747,528 | B1* | 6/2010 | Robinson | G06Q 20/24 |
| | | | | 705/44 |
| 8,175,973 | B2* | 5/2012 | Davis | G06Q 20/02 |
| | | | | 705/41 |
| 8,209,236 | B2* | 6/2012 | Stone | G06Q 10/08 |
| | | | | 705/26.1 |
| 8,266,002 | B2* | 9/2012 | Ramanathan | G06Q 20/12 |
| | | | | 705/26.1 |
| 8,498,939 | B1* | 7/2013 | Gupta | G06Q 30/0637 |
| | | | | 705/39 |
| 2009/0132405 | A1 | 5/2009 | Scipioni et al. | |
| 2014/0143151 | A1 | 5/2014 | Dhar et al. | |

OTHER PUBLICATIONS

Kaitz, R. E. (2004). Credit confusion: How much do consumers really understand, and benefit from, truth in lending disclosures?(Order No. 3160656). Available from ProQuest Central; ProQuest Dissertations & Theses Global. (305104251). Retrieved from http://search.proquest.com/docview/305104251?accountid=14753.*

"International Application Serial No. PCT/US2013/071100, International Search Report mailed Mar. 10, 2014", 2 pgs.

"International Application Serial No. PCT/US2013/071100, Written Opinion mailed Mar. 10, 2014", 7 pgs.

"U.S. Appl. No. 14/085,746, Final Office Action mailed Jun. 24, 2015", 19 pgs.

"U.S. Appl. No. 14/085,746, Non Final Office Action mailed Nov. 9, 2015", 20 pgs.

"U.S. Appl. No. 14/085,746, Non Final Office Action mailed Nov. 10, 2014", 19 pgs.

"U.S. Appl. No. 14/085,746, Response filed Feb. 10, 2015 to Non Final Office Action mailed Nov. 10, 2014", 22 pgs.

"U.S. Appl. No. 14/085,746, Response filed Sep. 23, 2015 to Final Office Action mailed Jun. 24, 2015", 18 pgs.

"European Application Serial No. 13857255.7, Response filed Oct. 30, 2015", 9 pgs.

"International Application Serial No. PCT/US2013/071100, International Preliminary Report on Patentability mailed Jun. 4, 2015", 9 pgs.

"Korean Application Serial No. 2015-7016219, Amendment filed Jun. 18, 2015", 3 pgs.

"U.S. Appl. No. 14/085,746, Final Office Action mailed May 19, 2016", 24 pgs.

"U.S. Appl. No. 14/085,746, Response filed Feb. 9, 2016 to Non Final Office Action mailed Nov. 9, 2015", 21 pgs.

"Australian Application Serial No. 2013347994, First Examiner Report mailed May 10, 2016", 3 pgs.

"Australian Application Serial No. 2013347994, Office Action mailed Mar. 1, 2016", 1 pgs.

"Australian Application Serial No. 2013347994, Response filed Apr. 8, 2016 to Office Action mailed Mar. 1, 2016", 18 pgs.

"Canadian Application Serial No. 2,891,935, Office Action mailed May 12, 2016", 5 pgs.

"European Application Serial No. 13857255.7, Extended European Search Report mailed Jun. 7, 2016", 8 pgs.

* cited by examiner www.shoppingsite.com/merchant

SHOPPING SITE     GIRLS     GUYS     GIFTS     SALE

YOUR SHOPPING CART

ITEM DESCRIPTION     PRICE     TOTAL

FULL ZIP HOODIE     $29.99     $29.99
COLOR: GREY
SIZE: SMALL
QUANTITY: 1
IN STOCK (SHIP IN 2 DAYS)

SUBTOTAL     $29.99
SHIPPING     $4.99
SALES TAX     $2.62
TOTAL     37.60

[ CHECKOUT WITH PAYMENT SERVICE ]     [ PROCEED TO SECURE CHECKOUT ]

SYSTEM AND METHOD FOR SIMPLIFIED CHECKOUT WITH PAYMENT FLOAT

CROSS REFERENCE TO RELATED APPLICATION

The present application claims the priority benefit of U.S. Provisional Patent Application Ser. No. 61/728,710 filed on Nov. 20, 2012 and entitled "Simplified Checkout," which is incorporated herein by reference.

FIELD

The present disclosure relates generally to electronic payments, and in a specific example embodiment, to providing a simplified checkout process with payment float.

BACKGROUND

Conventionally, a consumer may be required to enter a plurality of information to conduct an electronic payment. The plurality of information may include, for example, an account or credit card number, a billing address, a user name, and a shipping address. When using a payment provider service, the consumer may be required to create an account and provide one or more funding sources to fund a purchase or payment. This can cause a delay or inconvenience before an electronic payment (e.g., online payment) can be processed.

BRIEF DESCRIPTION OF DRAWINGS

Various ones of the appended drawings merely illustrate example embodiments of the present invention and cannot be considered as limiting its scope.

FIGS. 3A-3D are example screenshots illustrating example user interfaces providing simplified checkout.

FIGS. 4A-4G are example screenshots illustrating example user interfaces providing simplified checkout with payment float.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing a simplified checkout process with payment float. In example embodiments, an identifier that corresponds to a payment account of a user is received at a payment provider system. A determination is made whether the identifier corresponds to a payment account of the user at the payment provider system or whether a payment account needs to be created. A determination is also made to provide a float option to float payment for the user in a payment transaction involving a merchant system. A user interface providing the float option is presented to the user. If the user selects the float option, payment is floated to the user and the user agrees to pay back the floated payment within a predetermined time period.

By using example embodiments of the present invention, payment may be quickly made to the merchant system. The user simply needs to confirm use of the float payment without having to enter a funding source or having to wait for approval for the funding source. Accordingly, one or more of the methodologies discussed herein may obviate, for example, a need for providing and accessing the funding source and obtaining approval for a purchase at a time of purchase. This may have the technical effect of reducing computing resources used by one or more devices within the system. Examples of such computing resources include, without limitation, processor cycles, network traffic, memory usage, storage space, and power consumption.

Figure 1:
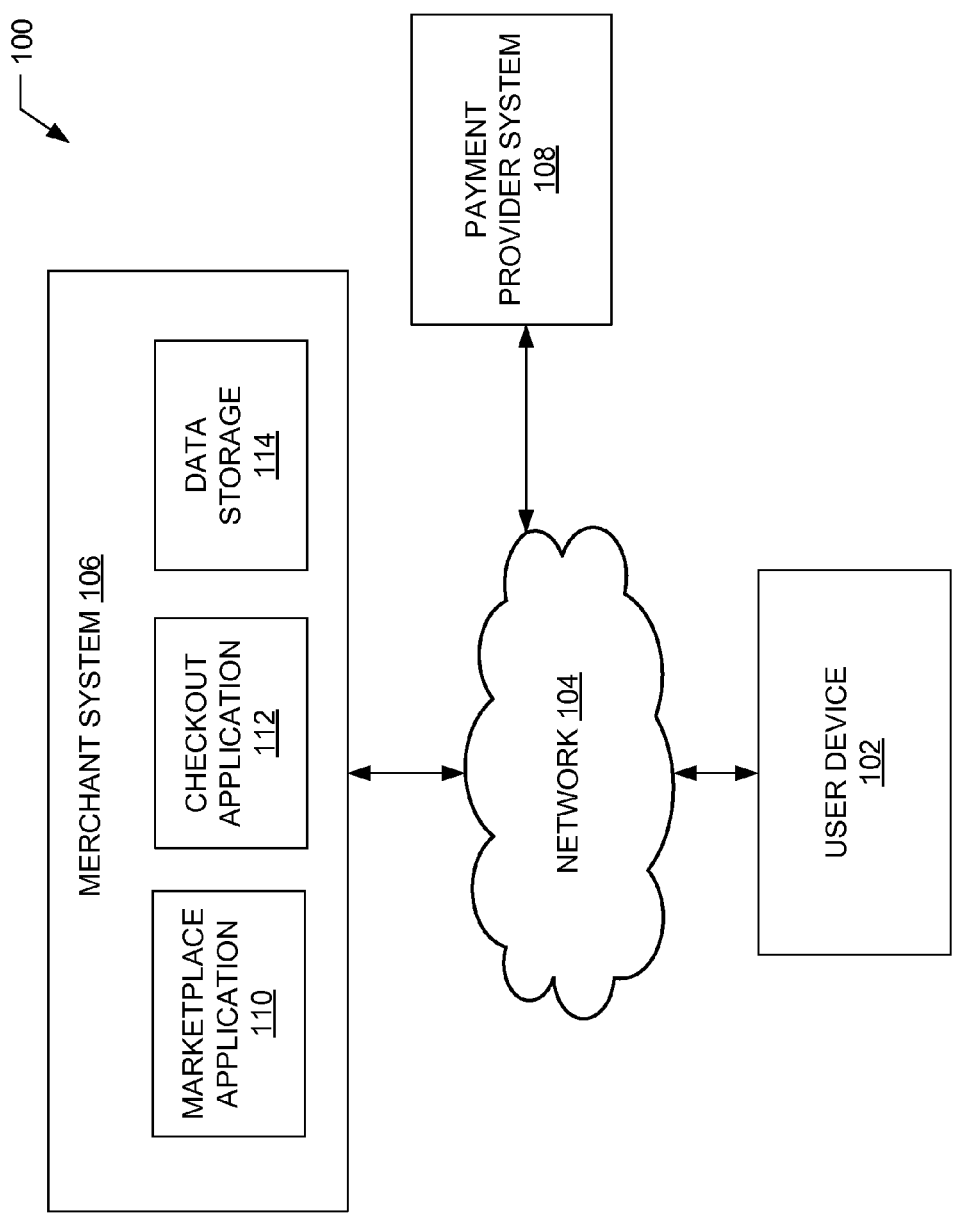
FIG. 1 is a diagram illustrating an example environment in which embodiments of a system for providing simplified checkout may be implemented.

With reference to FIG. 1, a diagram illustrating an example environment 100 in which embodiments of a system for providing simplified checkout may be implemented is shown. The environment 100 comprises a user device 102 coupled via a network 104 (e.g., the Internet, wireless network, cellular network, or a Wide Area Network (WAN)) to a merchant system 106 and a payment provider system 108. In example embodiments, the merchant system 106 is distinct from the payment provider system 108—that is the merchant system 106 is different or separate from the payment provider system 108. The network 104 may be implemented as a single network or a combination of a plurality of networks.

The user device 102 may be implemented using any appropriate hardware and software configured for wired or wireless communication over the network 104. Accordingly, the user device 102 may comprise a mobile phone, desktop computer, laptop computer, tablet, or any other communication device (e.g., mobile device) that a user may utilize to access and communicate via the network 104. Communications via the network 104 may include search requests for goods or services (collectively referred to as "items") that are offered for sale by a merchant via the merchant system 106, and transactions to be conducted for an item from the merchant system 106 including payment for the item. As such, the user device 102 may be a device of a user (e.g., consumer), which is used to perform a payment transaction involving items within the environment 100.

The user device 102 may include one or more browser applications (not shown) which may be used, for example, to provide a convenient interface to permit the user to browse information available over the network 104. For example, the browser application may be implemented as a web browser configured to view information available over the Internet or access a website of the merchant system 106 or the payment provider system 108.

Additionally, the user device 102 may include one or more user identifiers which may be implemented, for example, as operating system registry entries, cookies associated with the browser application, identifiers associated with hardware of the user device 102, or other appropriate identifiers which may be used for payment, user, or device authentication or identification. In one embodiment, the user identifier may be used by the payment provider system 108 to associate the user of the user device 102 with a payment account maintained by the payment provider system 108 as described in further detail below.

The merchant system 106 may comprise one or more servers or devices maintained or used by the merchant (or other sellers) to list items for sale (or auction) and to facilitate processing a purchase of an item. The merchant system 106 may be hosted on dedicated or shared server machines (not shown) that are communicatively coupled to enable communications between the server machines. Accordingly, the merchant system 106 may comprise a marketplace application 110 and a checkout application 112 to enable the listing and purchase of items.

The marketplace application 110 may comprise or create a marketplace system where items may be offered for sale. The items may include digital goods (e.g., currency, license rights) or physical goods. In one embodiment, the marketplace application 110 may provide a number of publishing, listing, and price-setting mechanisms whereby a seller or the merchant may list (or publish information concerning) goods or services for sale, a buyer can express interest in or indicate a desire to purchase such goods or services, and a price can be set for a transaction pertaining to the goods or services. Accordingly, the merchant system 106 may further include a data storage 114 storing listings, publications, or other information regarding available items for purchase. In one embodiment, the user device 102 may interact with the marketplace application 110 to view various items available for purchase from the merchant system 106.

The checkout application 112 may facilitate a purchase by the user of goods or services identified by the marketplace application 110. The checkout application 112 may be configured to accept account or payment information from or on behalf of the user through the payment provider system 108 over the network 104. For example, the checkout application 112 may transmit transaction information to the payment provider system 108 (e.g., purchase request, user identifier), receive information from the payment provider system 108 (e.g., a transaction identifier, stored user account information such as billing or shipping address), and receive and process a payment confirmation from the payment provider system 108. The checkout application 112 may also be configured to accept one or more different funding sources for payment processing from the user or the payment provider system 108.

The payment provider system 108 manages payments within the environment 100. In example embodiments, the payment provider system 108 may comprise one or more servers maintained by a payment service provider that manages payments between the user and an operator of the merchant system 106. In this regard, the payment provider system 108 may include one or more payment applications which may be configured to interact with the user device 102 and the merchant system 106 over the network 104 to facilitate the purchase of goods or services by the user of the user device 102. The payment provider system 108 will be discussed in more detail in connection with FIG. 2 below.

It is noted that the environment 100 shown in FIG. 1 is exemplary. For example alternative embodiments may comprise any number of user devices 102 and merchant systems 106 in the environment 100. Additionally, in an alternative embodiment, some functions of the checkout application 112 may be embodied within the payment provider system 108 and vice-versa.

Figure 2:
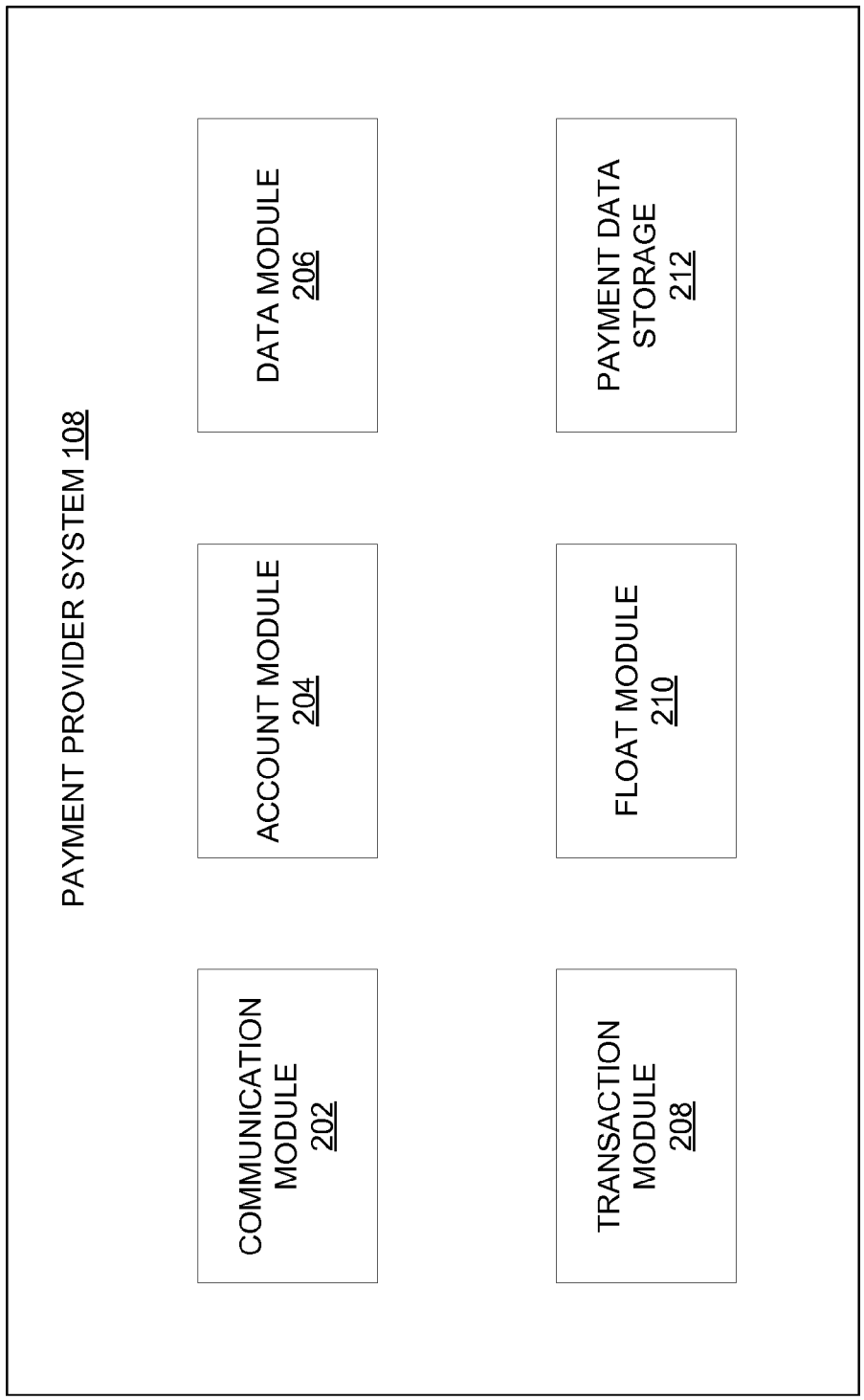
FIG. 2 is a block diagram illustrating an example embodiment of a payment provider system.

Referring now to FIG. 2, a detailed block diagram of the payment provider system 108 is shown. The payment provider system 108 manages the processing of payments for transactions between the user of the user device 102 and the merchant system 106. The transactions may involve the purchase of an item offered via the merchant system 106. Accordingly, the payment provider system 108 may comprise one or more payment and transaction applications that include a communication module 202, an account module 204, a data module 206, a transaction module 208, a float module 210, and a payment data storage 212 all communicatively coupled together. The multiple components themselves are communicatively coupled (e.g., via appropriate interfaces), either directly or indirectly, to each other and to various data sources to allow information to pass between the components or to allow the components to share and access common data. Advantageously, the components of the application(s) may be configured to interact with the merchant system 106 on behalf of the user of the user device 102 during a transaction with the checkout application 112 to manage payments.

The communication module 202 manages communications and exchange of data with other systems and devices of the environment 100. Accordingly, the communication module 202 may receive a request (e.g., an API call) for payment or account information of the user of the user device 102 or to process a payment transaction from the merchant system 106. In response, the communication module 202 may, for example, transmit instructions for causing presentation of one or more user interfaces where payment processing information may be viewable by the user.

The account module 204 manages payment accounts and authentication of a user of a payment account. Accordingly, the account module 204 receives login information (e.g., email address, cookie) and may determine existence of a payment account for the user of the user device 102 or may create a new account if necessary. Furthermore, the account module 204 may receive user credentials or login information (e.g., from the user entering the login information with the client device 102 or the merchant system 106) and authenticate the user using the login information. Additionally, the login information may be obtained from a cookie or other identifier from the user device 102. For example, the user device 102 may include one or more identifiers (e.g., operating system registry entries, cookies associated with the browser application, identifiers associated with hardware of the user device 102, payment/user/device authentication or identification identifiers) that may be used by the account module 204 to associate the user with their payment account, and which can be used to identify, login, or authenticate the user during a payment transaction process.

The data module 206 retrieves and provides account information from the payment account for populating transaction fields on a payment interface which may be provided on a website of the merchant system 106. In one embodiment, the data module 206 retrieves account information from the payment data storage 212. Each user account may have account information associated with the individual user. For example, the account information may include private financial information of the user (e.g., account number, credit card information, bank account information, billing address), passwords, device identifiers, user names, phone numbers, shipping address, or other information which may be used to facilitate online payment transactions for the user. In one embodiment, some of the account information may be provided to the merchant system 106 to populate (or pre-fill in) transaction fields on the payment interface provided on or associated with the website of the merchant system 106 as will be discussed in more detail below.

The transaction module 208 may comprise a transaction processing application that processes payment information to complete a payment transaction (e.g., to obtain payment from the user and send to the merchant). Accordingly, the transaction module 208 may receive information from the user device 102 or the merchant system 106 for processing and process the information. Furthermore, the transaction module 208 may store details of transactions to the payment data storage 212 and associate those details to a corresponding payment account of the user.

The float module 210 manages floating of a payment by the payment provider system 108 for the user. In example embodiments, the user may be able to make a purchase without a funding source or without providing payment at the time of the purchase transaction. The float module 210 may assess a risk to "float" payment to the user, for example, though accessing one or more social networks, IP addresses, or other public data. If the calculated risk is low and the user is approved, the payment provider service 108 may float the user for the purchase. Accordingly, the float module 210 (e.g., via the communication module 202) may cause a user interface to provide a float option to the user. The float module 210 may then receive an indication of acceptance of the float option and float payment for the user. In some embodiments, the float module 210 may inform the user of a predetermined time period that the user is required to pay the floated payment back to the payment provider system 108. Additionally, the float module 210 may provide a user agreement indicating terms and conditions of the float option to the user for review, and receive acknowledgement of agreement with the terms and conditions. The user is required to pay back the float amount within the predetermined time period (e.g., seven days). Example embodiments directed to floating payment will be discussed in more detail in connection with FIG. 4 below.

Figure 3B:
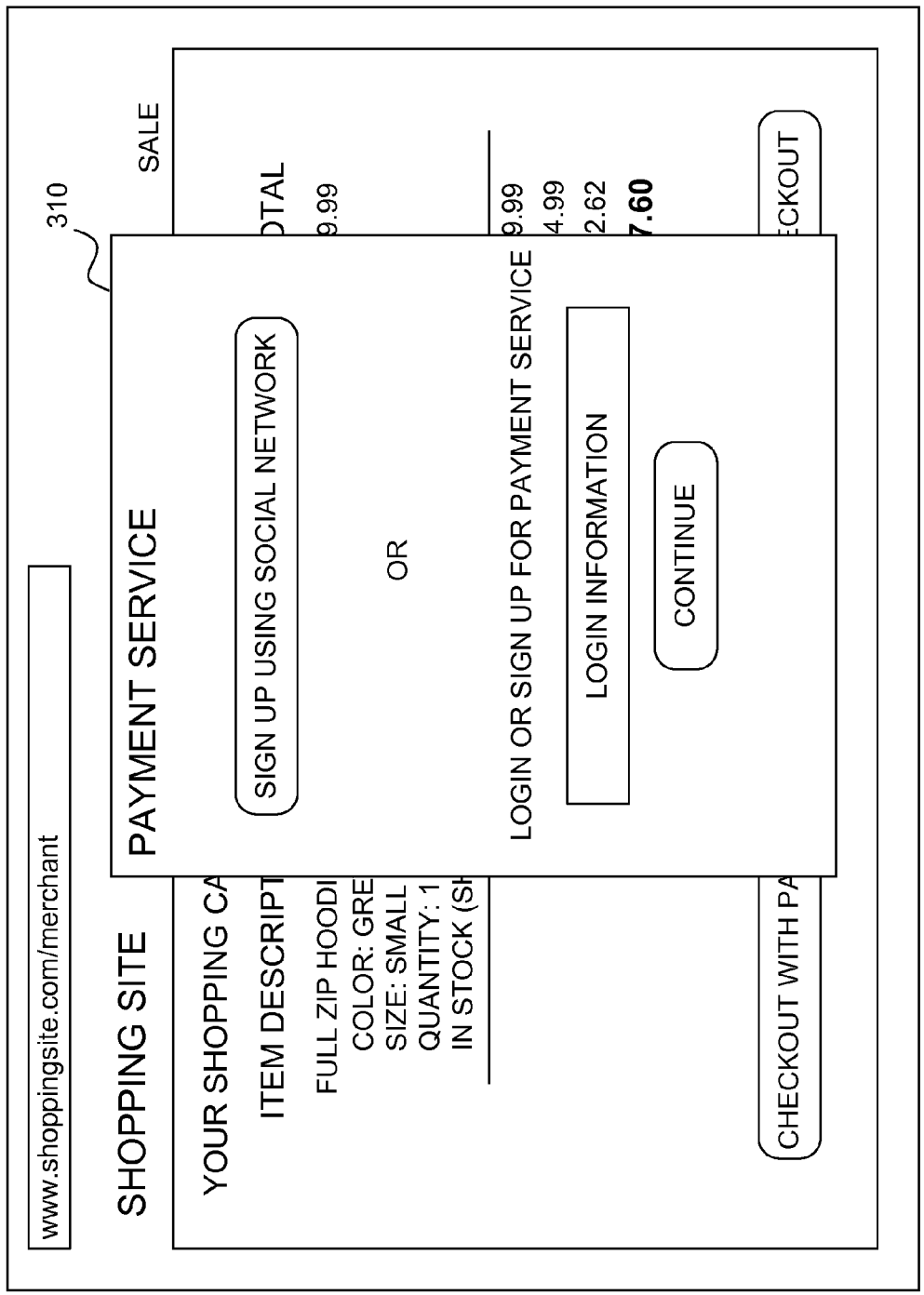

FIGS. 3A-3D are example screenshots illustrating user interfaces provided in a simplified checkout process. In accordance with one embodiment, the user simply provides a username and password associated with the payment account of the user at the payment provider system 108 in order to checkout (e.g., pay for purchase of an item). Referring to FIG. 3A, the user is on a website of the merchant or seller (e.g., provided by the merchant system 106). More specifically, the user may be on a shopping cart or shopping bag page of the website after having selected an item to purchase from the merchant or seller. The user may be provided an option in the form of a checkout button 302 to checkout using a payment service (e.g., provided by the payment provider system 108). Alternatively, the user may have an option to initiate payment using a conventional secure checkout process provided by the merchant.

Upon selection of the checkout button 302, a pop-up interface 310 may be presented to the user as shown in FIG. 3B. The user remains on the merchant's website while the pop-up interface 310 is presented. The pop-up interface 310 may request that the user provide identifier or login information, such as an email address, associated with the user's payment account at the payment provider system 108. Other login information such as a user name or password may also be provided in various embodiments. The login information may also be obtained from a cookie or other identifier from the user device 102. For example, the user device 102 may include one or more identifiers (e.g., operating system registry entries, cookies associated with the browser application, identifiers associated with hardware of the user device 102, payment/user/device authentication or identification identifiers) that may be used by the payment provider system 108 to associate the user with their payment account, and which may be used to access, login, or authenticate the user during the payment process. If the user does not have a payment account with the payment provider system 108, the user may sign up for the payment account through the pop-up interface 310.

Further still, the user may sign up (or sign in) using information associated with a social network. For example, if the user has a Facebook® account, the user may sign up for the payment account by using information that is already stored to their Facebook® account.

In one embodiment, the payment provider system 108 may have knowledge of the user's login information (e.g., email address) from the user device 102, such as through a previous use. In this embodiment, the user may skip having to enter the login information in the interface 310 of FIG. 3B and may be taken directly to the interface shown in FIG. 3C.

Figure 3C:
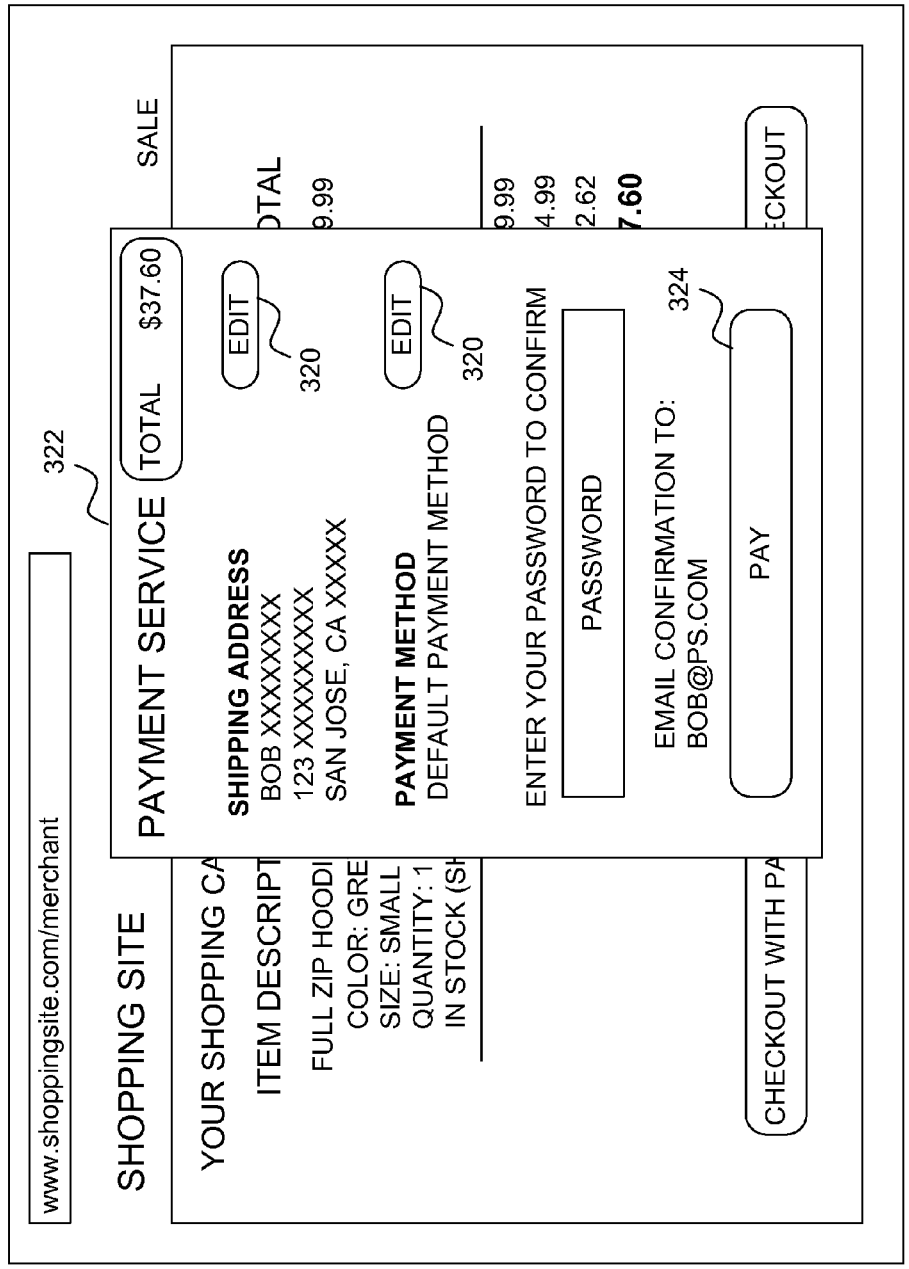

Assuming the user has a payment account with the payment provider system and has logged into their payment account (or provided enough information such as an identifier of the user or the user device 102 for the payment provider system 108 to identify the user and access the payment account), the user may be presented with a user interface with transaction fields populated with account information from the payment provider system 108 as shown in the example screenshot of FIG. 3C. While the transaction fields are shown in a payment interface 322 that is a pop-up screen, alternatively, the transaction fields may equally as well be provided on a main screen or interface of the merchant website.

The transaction fields may include, for example, a shipping address, billing address, and funding source information (e.g., default payment method). In one embodiment, the shipping address and/or the funding source information may be partially redacted for security. In one embodiment, the funding source information may only indicate a funding method to be used, but does not provide enough financial account information that would allow the merchant system 106 to process the payment transaction. In other embodiments, more or less of the account information may be shown. Additionally, while the funding source information is simply shown as "default payment method" for the payment account, more detailed information may be shown (e.g., full or partial credit card numbers). The populated account information may be edited (or replaced with new account information) by selecting an edit button 320.

Once the user has verified or corrected the account information, the user may select a payment confirmation button 324 to trigger the payment transaction processing (e.g., place and pay for an order of the item). In one embodiment, the user may be requested to enter a password corresponding to the payment account to confirm the payment transaction. In accordance with one embodiment, the checkout application 112 may send a payment transaction request to the payment provider system 108 to process the payment transaction using the account or payment information in the transactions fields. In an alternative embodiment, the merchant system 106 may process the payment transaction using the account information in the transaction fields.

Figure 3D:
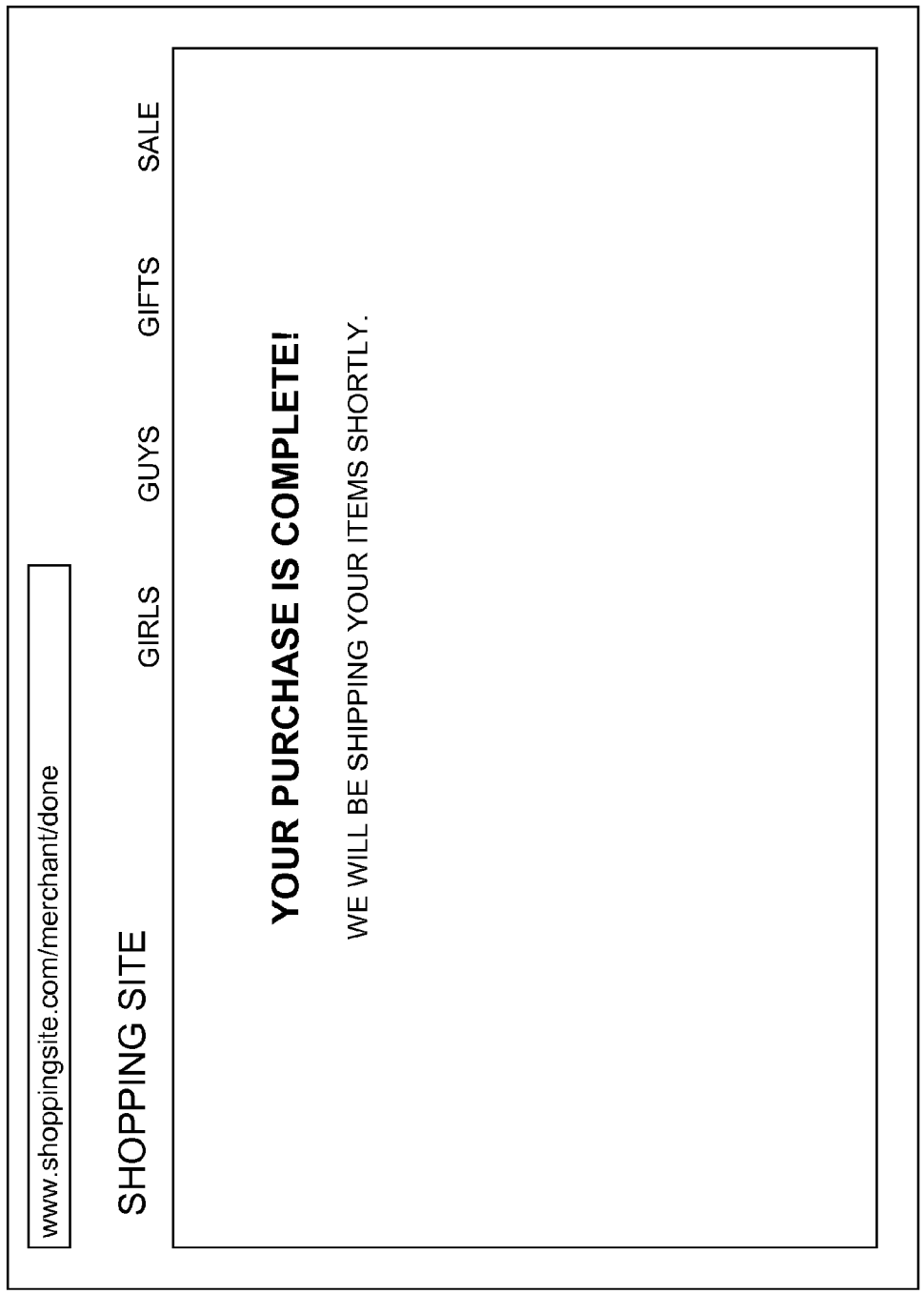

In either case, the user is presented with the user interface shown in FIG. 3D upon completion of the payment processing (e.g., payment is authorized) that confirms completion of the purchase transaction.

It is noted that the user remains on the website provided by the merchant system 106 during the payment transaction process. As such, the merchant system 106 (e.g., via the checkout application 112) may exchange data with the payment provider system 108 to send and receive transaction information (e.g., send identifier information to the payment provider system 108, receive account information from the payment provider system 108). As such, the user may transact for an item (e.g., checkout) simply by entering, for example, an email address and a password, without having to leave the merchant's website.

Figure 4A:
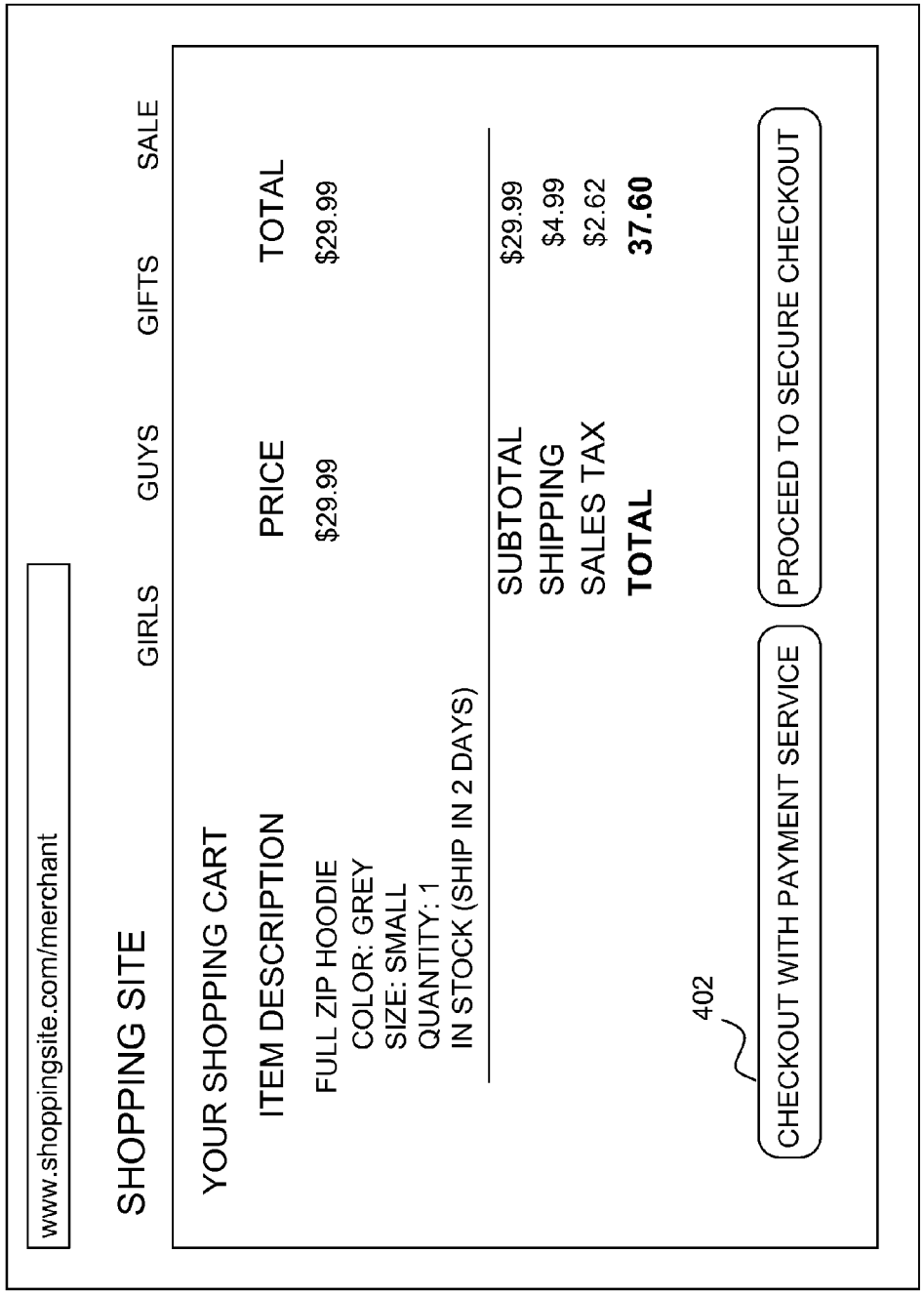

FIGS. 4A-4G are example screenshots illustrating example user interfaces for providing simplified checkout with payment float. Referring to FIG. 4A, the user is on a website of the merchant or seller (e.g., provided by the merchant system 106). More specifically, the user may be on a shopping cart or shopping bag page of the website after having selected an item to purchase from the merchant or seller, and is ready to checkout. The user may be provided an option in the form of a checkout button 402 to checkout using a payment service (e.g., provided by the payment provider system 108). Alternatively, the user may have an option to initiate payment using a conventional secure checkout process provided by the merchant.

Figure 4B:
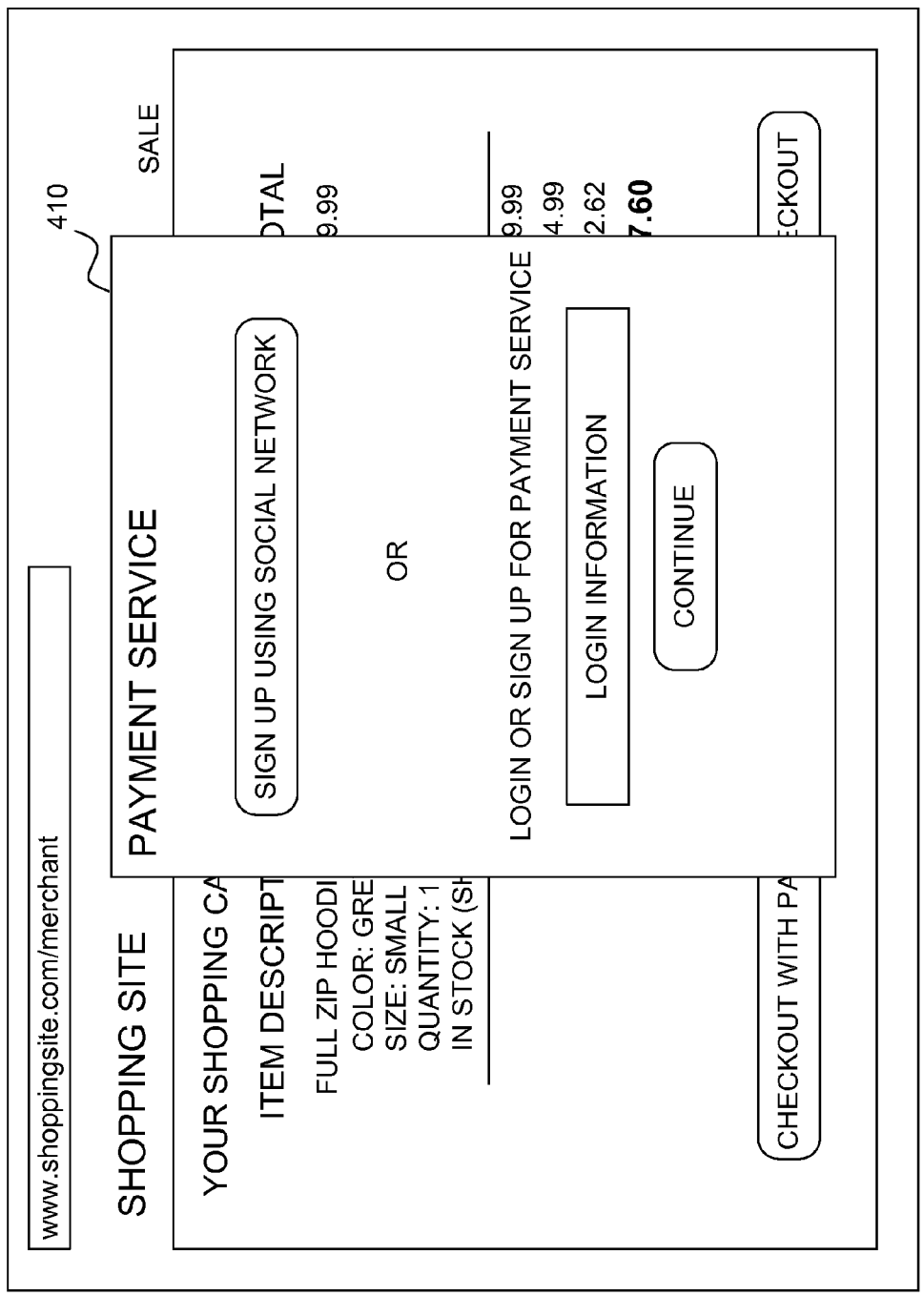

Upon selection of the checkout button 402, a pop-up interface 410 may be presented to the user as shown in FIG. 4B. The user remains on the merchant's website while the pop-up interface 410 is presented. The pop-up interface 410 may request that the user provide identifier or login information, such as an email address, associated with the user's payment account at the payment provider system 108. Other login information such as user name or password may also be provided in various embodiments. The login information may also be obtained from a cookie or other identifier from the user device 102. For example, the user device 102 may include one or more identifiers (e.g., operating system registry entries, cookies associated with the browser application, identifiers associated with hardware of the user device 102, payment/user/device authentication or identification identifiers) that may be used by the payment provider system 108 to associate the user with their payment account, and which can be used to access, login, or authenticate the user during the payment process. If the user does not have a payment account with the payment provider system 108, the user may sign up for the payment account through the pop-up interface 410. Further still, the user may sign up (or sign in) using information associated with a social network. For example, if the user has a Facebook® account, the user may sign up for the payment account by using information that is already stored to their Facebook® account.

Figure 4C:
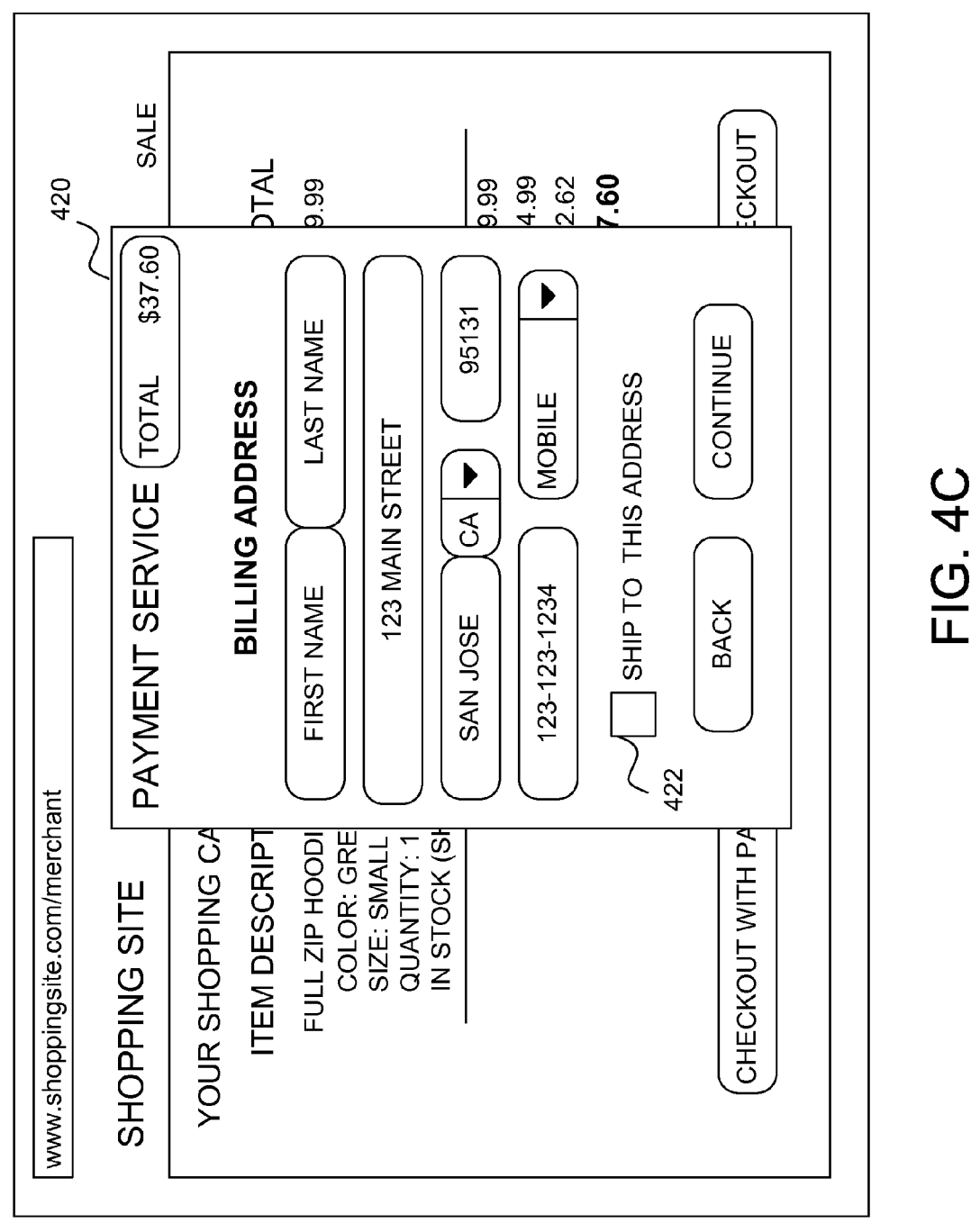

Assuming the user has a payment account with the payment provider system and has logged into their payment account (or provided an email address or enough information such as an identifier of the user or the user device 102 for the payment provider system 108 to identify the user and access the payment account), the user may be presented with a user interface 420 with transaction fields populated (or pre-filled in) with account information from the payment provider system 108 as shown in the example screenshot of FIG. 4C. While the transaction fields are shown in a pop-up interface 420, alternatively, the transaction fields may equally as well be provided on a main screen or interface of the merchant website. In the example of FIG. 4C, the pop-up interface 420 is a billing address interface where billing address and a phone number of the user are populated into the transaction fields. The populated account information may be revised (or replaced with new account information) by the user.

Figure 4D:
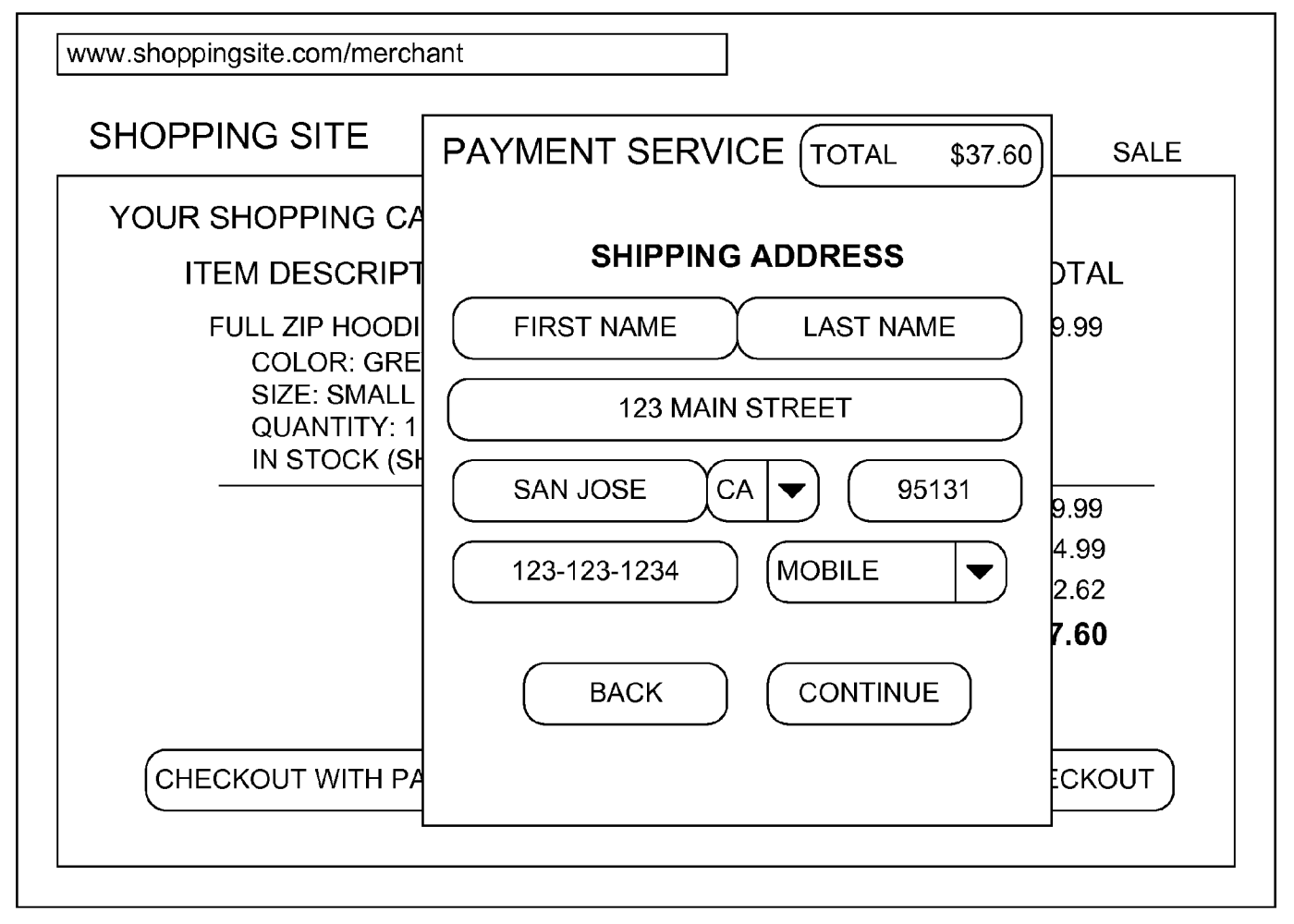

If the shipping address is the same as the billing address, the user may simply select a box 422 that indicates the same address. In response, the shipping address may be populated into a shipping address user interface as shown in FIG. 4D. Alternatively, if the shipping address is not the same as the billing address, the user may be presented with a similar shipping address user interface only without the fields populated. The user may then enter the shipping address.

Figure 4E:
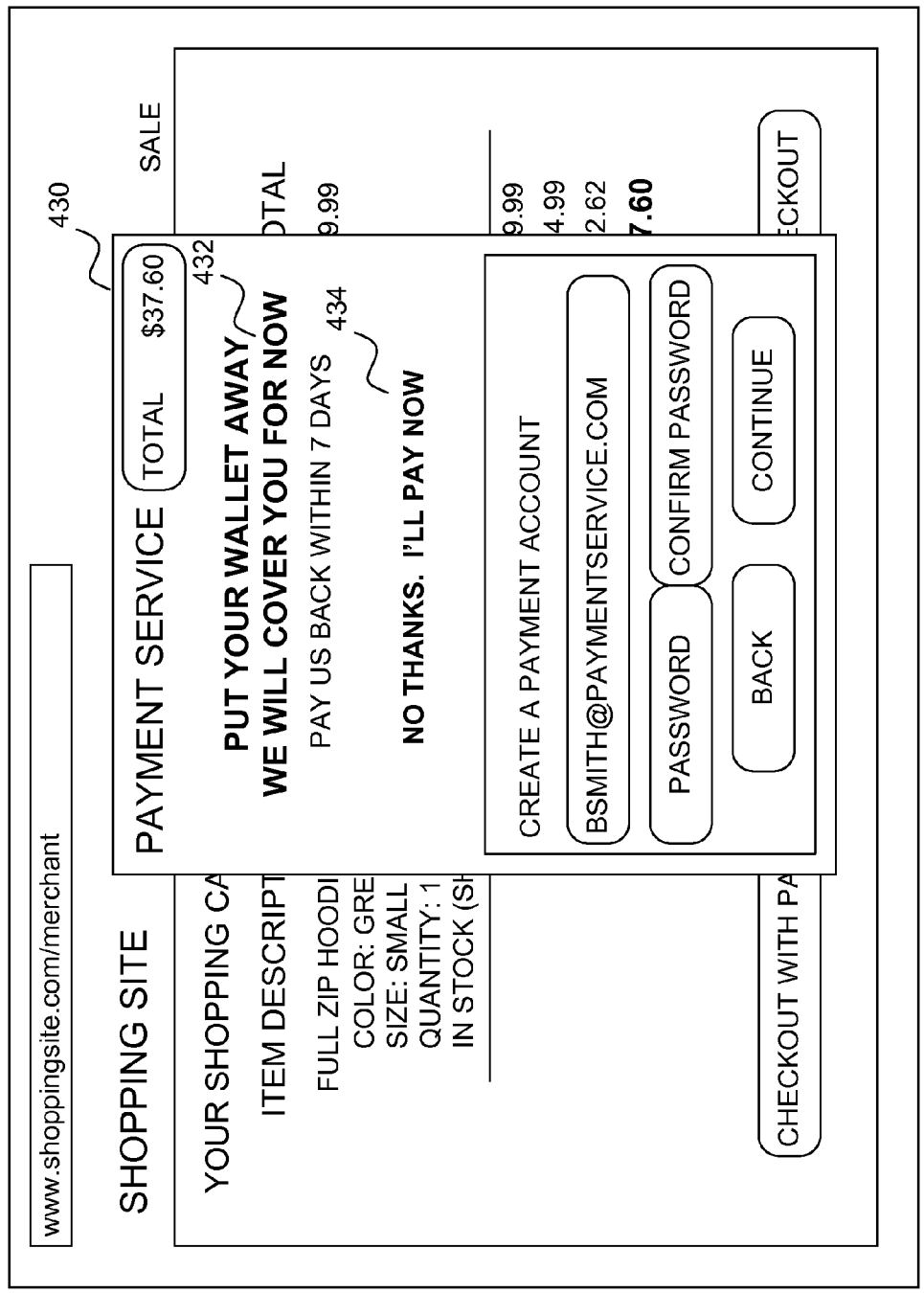

Referring now to FIG. 4E, the payment provider system 108 may offer to float payment to the user. In one embodiment, the payment provider system 108 may determine whether to float the payment using social network or other publicly available information. As such, the user interface 430 informs the user that they do not need to supply any funding source, and that the payment provider system 108 will pay for the purchase with the user paying the payment provider system 108 back within a predetermined time period (e.g., 7 days).

Figure 4F:
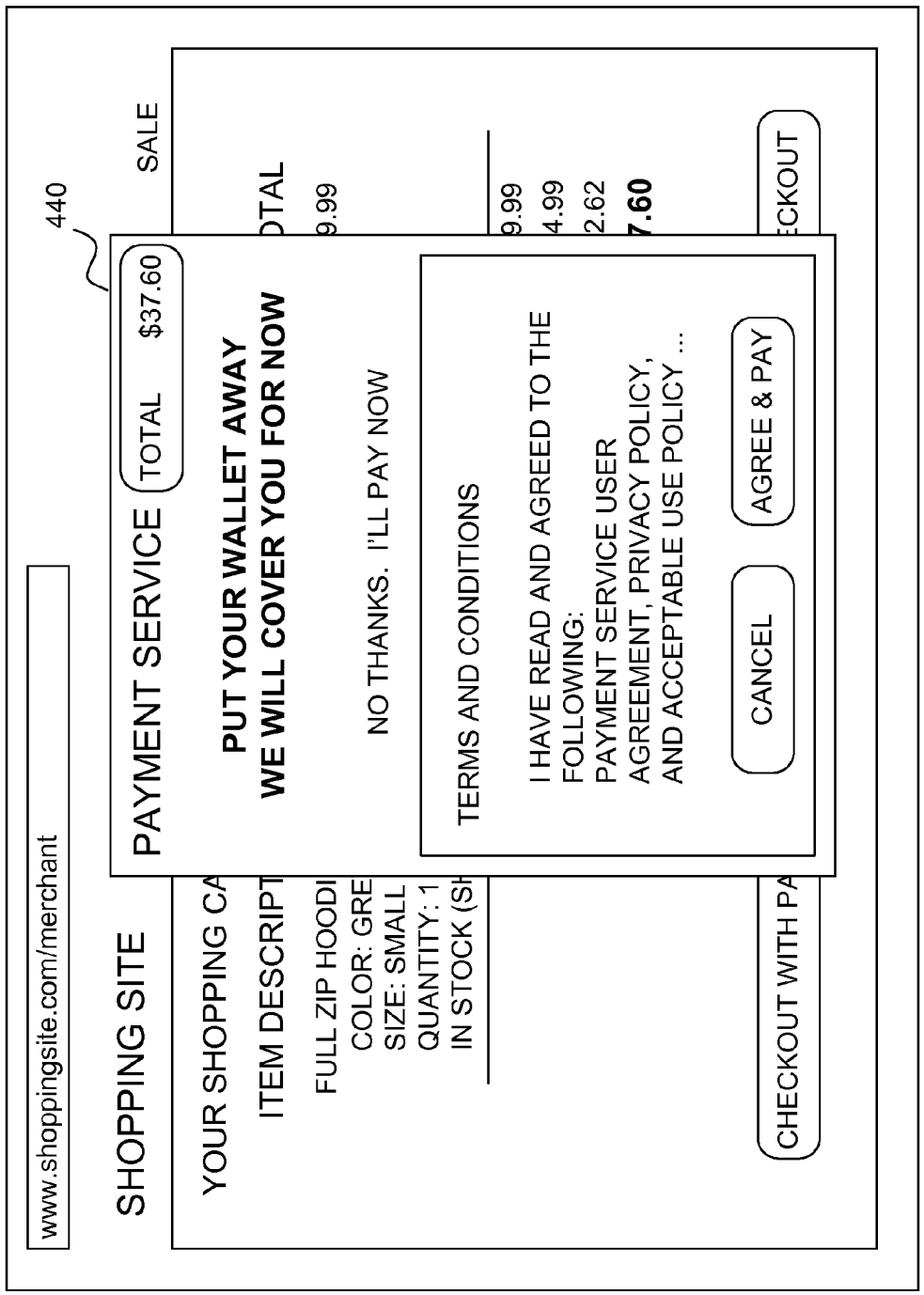
Figure 4G:
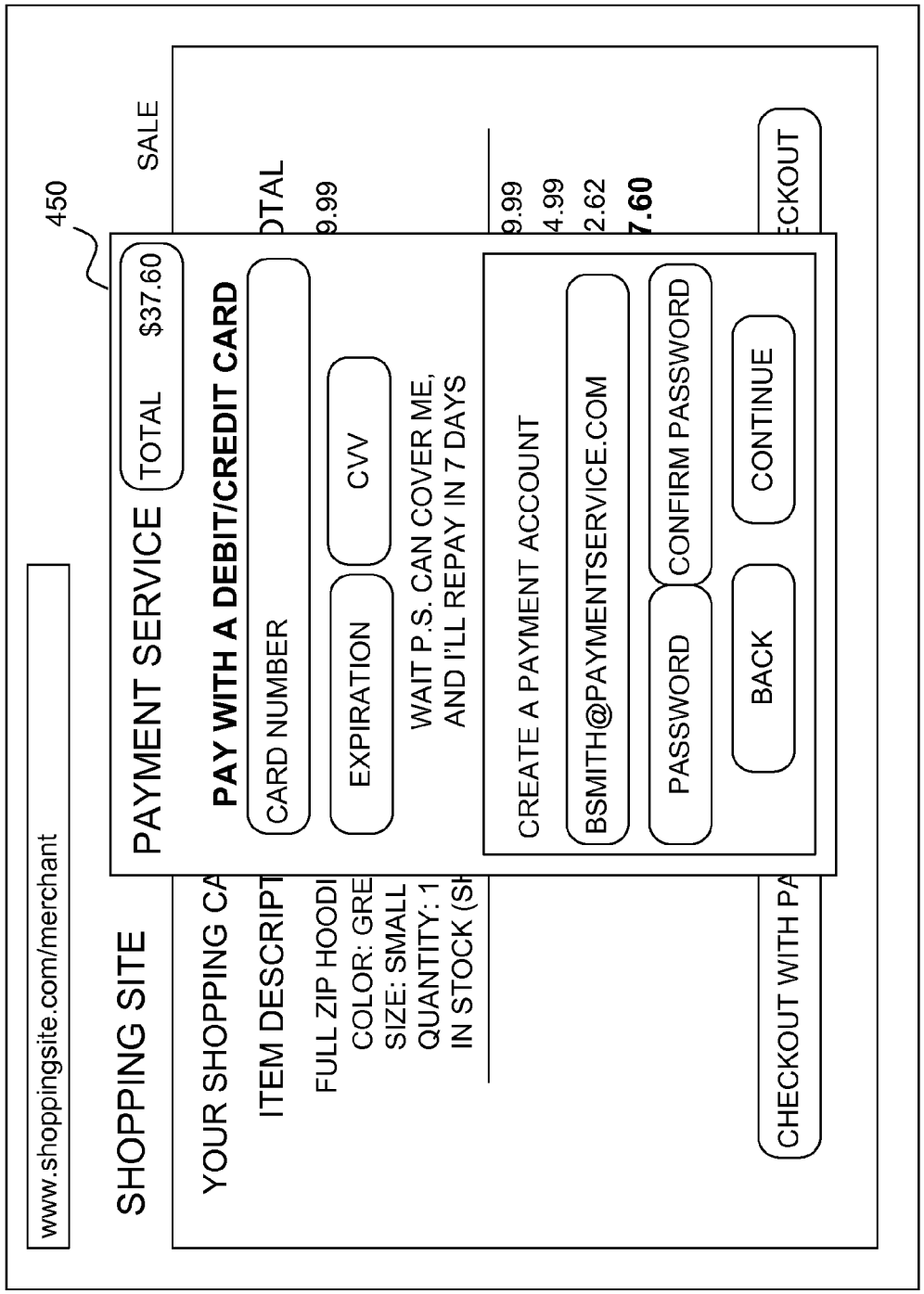

If the user selects to have the payment floated by the payment provider system 108 (e.g., by selecting a link 432), the user is presented with a further user interface 440 that displays a user agreement for using the float option as shown in FIG. 4F. The user may be required to provide acknowledgement of agreement with the terms and conditions of the user agreement. In embodiments where the user would like to use the float option and does not have a payment account with the payment provider system 108, the user may create the payment account by, for example, entering and confirming a password as shown in FIG. 4E.

If the user does not wish to use the float option, the user may select a link 434 in FIG. 4E to pay using a user funding source. In this embodiment, the user may be provided a user interface 450 of FIG. 4G which asks the user to enter specific information about the funding source (e.g., credit or debit card). The user may also create a payment account with the payment provider system 108 on this user interface 450. It is further noted that, in example embodiments, the populated transaction process discussed in connection with FIG. 3A-3D may be utilized if the user does not wish to use the float option.

Figure 5:
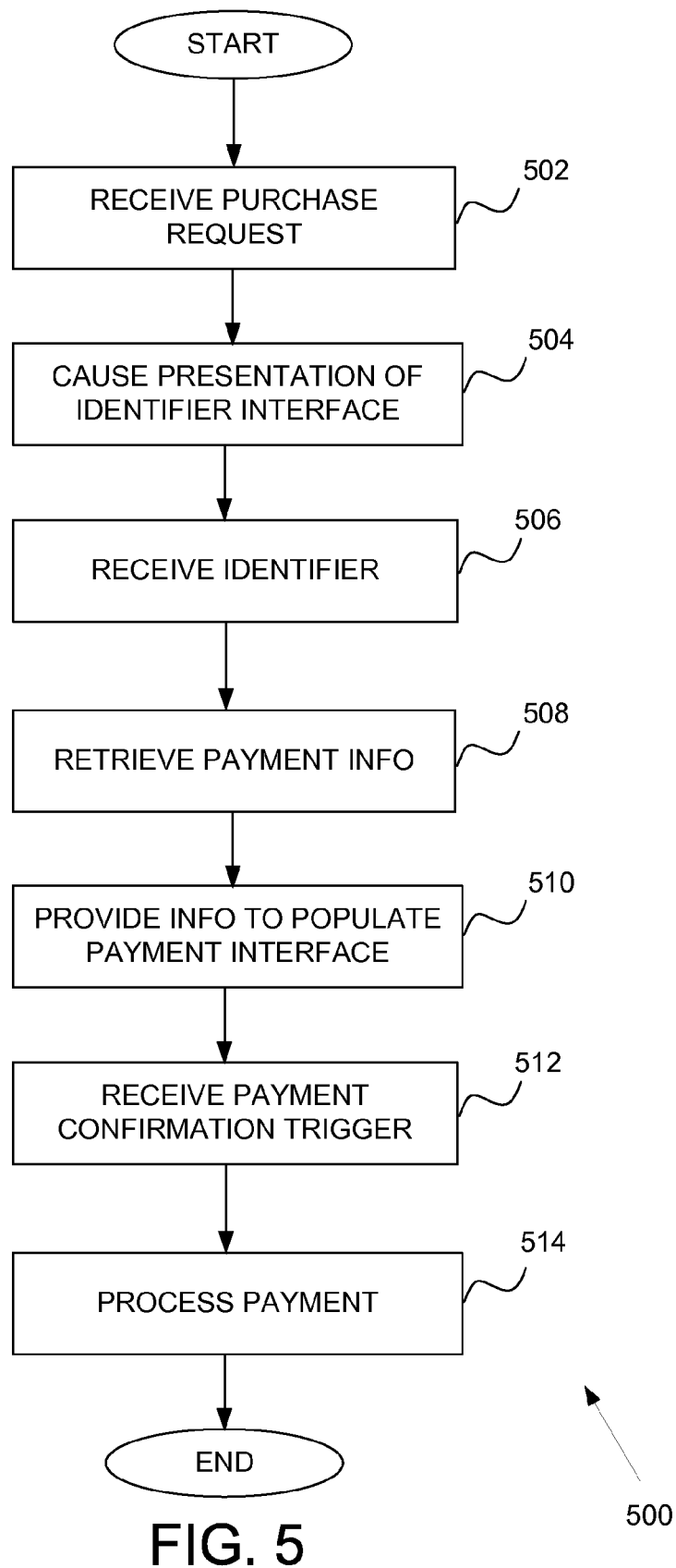
FIG. 5 is a flow diagram of an example high-level method for providing simplified checkout.

FIG. 5 is a flow diagram of an example high-level method 500 for providing simplified checkout at a merchant website (hosted by the merchant system 106) using account information provided by the payment provider system 108. The method 500 is discussed from the perspective of the payment provider system 108.

In operation 502, a purchase request is received. In example embodiments, the communication module 202 may receive a request (e.g., an API call) that initiates the payment process.

In response, the communication module 202 may, for example, cause presentation of an identifier interface (e.g., pop-up interface 310) in operation 504. In one embodiment, the communication module 202 may provide the identifier interface to be displayed in association with the merchant website. In an alternative embodiment, the communication module 202 may provide instructions that cause the merchant system 106 to present the identifier interface. In a further embodiment, the identifier interface is generated by the merchant system 108 without instructions from the communication module 202, resulting in operation 504 being optional or not necessary.

In operation 506, an identifier is received by the communication module 202. In some embodiments, the identifier is a user name, email address, or other identifier that the user provides or enters onto the identifier interface that is presented based on operation 504. In other embodiments, the identifier may be an identifier linked to the user device 102 of the user. For example, the identifier may be an operating system registry entry, a cookie associated with the browser application of the user device 102 or an identifier associated with hardware of the user device 102. In the case where the identifier is that of the user device, operation 504 may be optional.

In operation 508, account information may be retrieved based on the identifier received in operation 506. Accordingly, the account module 204 may determine whether a payment account exists for the user. If the payment account does exist, the data module 206 may retrieve certain account information from the payment account. The account information may include any one or more of a billing address, shipping address, and funding source information (e.g., method of payment without providing full financial account information).

In operation 510, the account information is used to populate a payment interface (e.g., payment interface 322 of FIG. 3C). In one embodiment, the payment interface is generated by the merchant system 108 without instructions from the payment provider system 108. In another embodiment, the data module 206 or communication module 202 may provide the payment interface to the merchant system 106 to be displayed in association with the merchant website (e.g., as a pop-up over a merchant webpage or in fields on the merchant webpage) and/or provide instructions that cause the merchant system 106 to present the payment interface on their website.

A payment confirmation trigger is received in operation 512. In one embodiment, the payment process confirmation may include a password provided by the user to trigger the payment processing. The password may be used by the payment provider system 108 (e.g., the account module 202 or the transaction module 208) to verify or authenticate the user in order to process the payment transaction. In example embodiments, the communication module 202 receives the payment confirmation trigger and forwards any account information and transaction information received with the payment confirmation trigger (e.g., cost of product, shipping charges, taxes, total purchase price) to the transaction module 208. The transaction module 208 may process and complete the payment transaction in operation 514. In some cases, the transaction module 208 may access the payment data storage 212 to obtain any further account information needed to complete the payment transaction (e.g., credit card account number corresponding to the funding source information). Confirmation of completion of the payment transaction may be provided to the user (e.g., send a confirmation email).

While the operations of the method 500 were discussed from the perspective of the payment provider system 108, it is evident that reciprocal operations are performed at the merchant system 106. In alternative embodiments, some of the operations of the method 500 may be performed by the checkout application 112 of the merchant system 106. For example, the payment provider system 108 may simply obtain the identifier (operation 506) in order to retrieve the account information (operation 508) and provide the account information to the merchant system 106 (operation 510). The merchant system 106 may then process the payment using the received account information.

Figure 6:
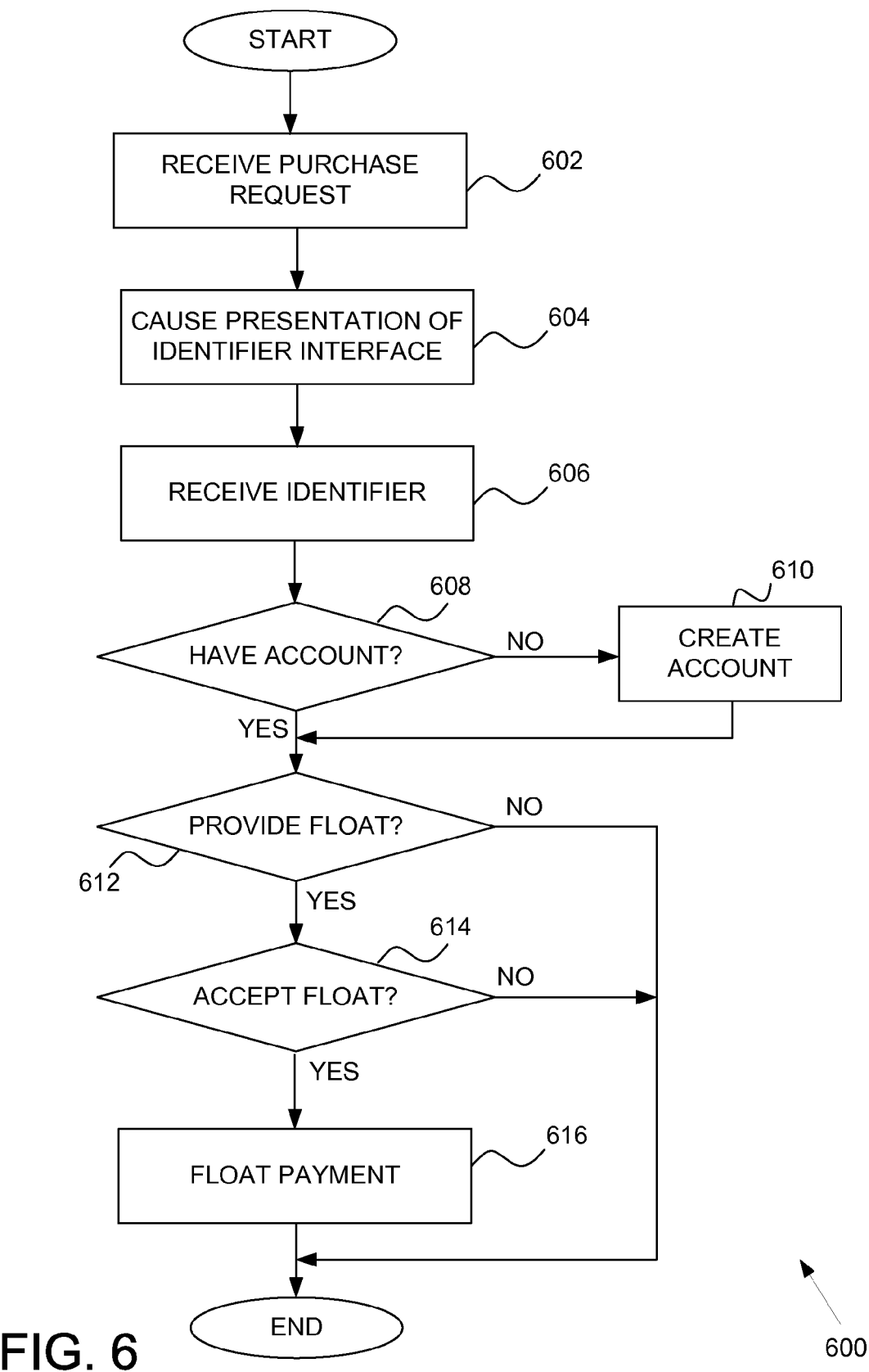
FIG. 6 is a flow diagram of an example high-level method for providing simplified checkout with a payment float option.

FIG. 6 is a flow diagram of an example high-level method 600 for providing simplified checkout at a merchant website (hosted by the merchant system 106) with a payment float option. The method 600 is discussed from the perspective of the payment provider system 108.

In operation 602, a purchase request is received. In example embodiments, the communication module 202 may receive a request (e.g., an API call) that initiates the payment process.

In response, the communication module 202 may, for example, cause presentation of an identifier interface (e.g., pop-up interface 410) in operation 604. In one embodiment, the communication module 202 may provide the identifier interface to be displayed in association with the merchant website. In an alternative embodiment, the communication module 202 may provide instructions that cause the merchant system 106 to present the identifier interface. In a further embodiment, the identifier interface is generated by the merchant system 108 without instructions from the communication module 202, resulting in operation 604 being optional or not necessary.

In operation 606, an identifier is received by the communication module 202. In some embodiments, the identifier is a user name, email address, or other identifier that the user provides or enters onto the identifier interface that is presented based on operation 604. In other embodiments, the identifier may be an identifier linked to the user device 102 of the user. For example, the identifier may be an operating system registry entry, a cookie associated with the browser application of the user device 102, or an identifier associated with hardware of the user device 102. In the case where the identifier is that of the user device, operation 604 may be optional.

In operation 608, a determination is made as to whether the user has a payment account with the payment provider system 108. The account module 204 may perform the determination. If no account exists, then a payment account may be created for the user in operation 610 if the user wishes to create the payment account.

Once the payment account is created or if the payment account already exists for the user, then in operation 612, the float module 210 determines whether to float payment for the user. For example, the float module 210 may assess a risk to "float" payment to the user, for example, though accessing one or more social networks, IP addresses, or other public data. If the calculated risk is low and the user is approved, the float module 210 may provide a float option to the user. It is noted that in some cases, the determination to float payment may be made prior to creating a payment account for the user.

In operation 614, a determination is made as to whether the user accepts the float option. If the user accepts the float option, the payment provider system 108 may pay for the purchase and expect payment from the user within a predetermined time period (e.g., seven days).

Figure 7:
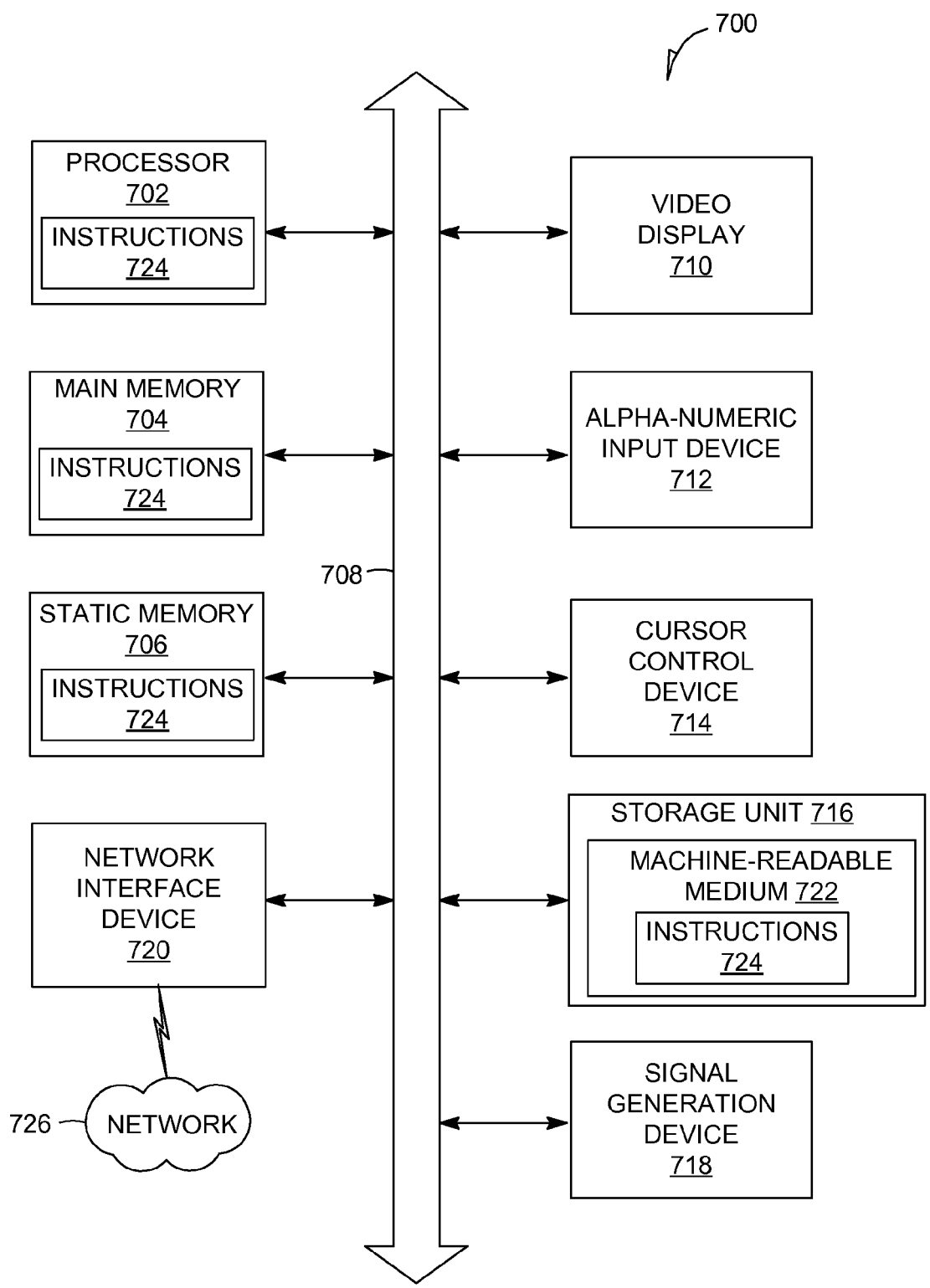
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alpha-numeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A tangible machine-readable storage device storing instructions which, when executed by the at least one processor of a machine, cause the machine to perform operations for providing simplified checkout at a website of a merchant system using account information provided by a payment provider system, the operations comprising:

receiving, at the payment provider system via a network from the merchant system, an API call including an indication to complete a transaction using a third party payment service of the payment provider system without a user leaving the website of the merchant system, the payment provider system being distinct from the merchant system;

in response to the API call, causing, by the payment provider system, the merchant system to present an identifier interface while the user remains on the website of the merchant system;

receiving, at the payment provider system, an identifier associated with a user, the identifier received via the identifier interface presented on a device of the user;

determining that the received identifier corresponds to a payment account of the user at the payment provider system;

in response to the determining the identifier corresponds to the payment account of the user, assessing a risk for providing a float option without prior user selection of the float option, the float option to float payment for the user in a payment transaction involving the merchant system; and in response to a determination that the risk is low and the user is approved for the float option, causing the merchant system to replace the identifier interface with a user interface providing the float option to the user, the user interface being presented while the user continues to remain on the webpage of the merchant system.

2. The tangible machine-readable storage device of claim 1, wherein the user interface providing the float option comprises a selection for accepting the float option, a selection for refusing the float option, and an indication of an amount of time a payment is floated by the payment service provider.

3. The tangible machine-readable storage device of claim 1, wherein the identifier interface is a pop-up interface presented over the webpage of the merchant system.

4. The tangible machine-readable storage device of claim 1, wherein the identifier is an email address of the user.

5. The tangible machine-readable storage device of claim 1, wherein the user interface presenting the float option comprises a pop-up interface presented over the webpage of the merchant system.

6. The tangible machine-readable storage device of claim 1, wherein the operations further comprise:
receiving an indication of acceptance of the float option; and
floating payment for the user in response to receiving the indication.

7. The tangible machine-readable storage device of claim 1, wherein the operations further comprise:
receiving an indication of refusal of the float option; and
in response to receiving the indication of refusal, causing presentation of a funding source user interface in which funding source information is provided, the funding source user interface comprising a further indication of the float option available to the user.

8. The tangible machine-readable storage device of claim 1, wherein the operations further comprise:
in response to receiving an indication of acceptance of the float option, providing a user agreement indicating terms and conditions of the float option to the user for review; and
receiving acknowledgement of agreement with the terms and conditions.

9. The tangible machine-readable storage device of claim 1, wherein the assessing the risk comprises:
accessing information from a social network; and
using the information from the social network to assess the risk.

10. A method comprising:
receiving, at a payment provider system via a network from a merchant system, an API call including an indication to complete a transaction using a third party payment service of the payment provider system without a user leaving the website of the merchant system, the payment provider system being distinct from the merchant system;

in response to the API call, causing, by the payment provider system, the merchant system to present an identifier interface while the user remains on the website of the merchant system;

receiving, at the payment provider system, an identifier associated with a user, the identifier received via the identifier interface presented on a device of the user;

determining that the received identifier corresponds to a payment account of the user at the payment provider system;

in response to the determining the identifier corresponds to the payment account of the user, assessing, using a hardware processor, a risk for providing a float option without prior user selection of the float option, the float option to float payment for the user in a payment transaction involving the merchant system; and in response to a determination that the risk is low and the user is approved for the float option, causing the merchant system to replace the identifier interface with a user interface providing the float option to the user, the user interface being presented while the user continues to remain on the webpage of the merchant system.

11. The method of claim 10, wherein the user interface providing the float option comprises a selection for accepting the float option, a selection for refusing the float option, and an indication of an amount of time a payment is floated by the payment service provider.

12. The method of claim 10, further comprising:
receiving an indication of acceptance of the float option; and
floating payment for the user in response to receiving the indication.

13. The method of claim 10, further comprising informing the user of a predetermined time period that the user is required to pay the payment back to the payment provider system.

14. The method of claim 10, further comprising:
in response to receiving an indication of acceptance of the float option, providing a user agreement indicating terms and conditions of the float option to the user for review; and
receiving acknowledgement of agreement with the terms and conditions.

15. The method of claim 10, wherein the assessing the risk comprises:
accessing information from a social network;
using the information from the social network to assess the risk.

16. A system comprising:
one or more hardware processors configured to perform operations comprising:
receiving, at a payment provider system via a network from a merchant system, an API call including an indication to complete a transaction using a third party payment service of the payment provider system without a user leaving the website of the merchant system, the payment provider system being distinct from the merchant system;
in response to the API call, causing, by the payment provider system, the merchant system to present an identifier interface while the user remains on the website of the merchant system;

receiving an identifier that associated with a user, the identifier received via the identifier interface presented on a device of the user;

determining that the received identifier corresponds to a payment account of the user at the payment provider system;

in response to a determination that the identifier corresponds to the payment account of the user, assess a risk for providing a float option without prior user selection of the float option, the float option to float payment for the user in a payment transaction involving the merchant system, and in response to a determination that the risk is low and the user is approved for the float option, causing the merchant system to replace the identifier interface with a user interface providing the float option to the user, the user interface being presented while the user continues to remain on the webpage of the merchant system.

17. The system of claim 16, wherein the operations further comprise:

receiving an indication of acceptance of the float option; and floating payment for the user in response to receiving the indication.

18. The system of claim 16, wherein the operations further comprise informing the user of a predetermined time period that the user is required to pay the payment back to the payment provider system.

19. The system of claim 16, wherein the operations further comprise:

in response to receiving an indication of acceptance of the float option, providing a user agreement indicating terms and conditions of the float option to the user for review, and receiving acknowledgement of agreement with the terms and conditions.

20. The system of claim 16, wherein the assessing the risk is based on information accessed from a social network.

* * * * *